United States Patent [19]

Jones et al.

[11] 3,757,259

[45] Sept. 4, 1973

[54] NOVEL MOUNTING TECHNIQUE FOR GLASS-PACKAGE DIODES

[75] Inventors: Robert J. Jones, Liverpool; Robert C. Armani, North Syracuse, both of N.Y.

[73] Assignee: The United States of America as represented by the Secretary of the Army

[22] Filed: Apr. 28, 1972

[21] Appl. No.: 248,373

[52] U.S. Cl. .............. 333/84 M, 333/97 R, 329/160
[51] Int. Cl. .............. H01p 1/00, H01p 3/08
[58] Field of Search .............. 333/22 R, 22 F, 84 M, 333/97 R; 329/160

[56] References Cited

UNITED STATES PATENTS

| | | | |
|---|---|---|---|
| 3,402,361 | 9/1968 | Havens | 333/84 M |
| 3,328,730 | 6/1967 | Dowdell, Jr. | 333/84 R |
| 3,596,130 | 7/1971 | Clark | 333/84 M |
| 2,734,170 | 2/1956 | Engelmann et al. | 333/84 M |
| 3,573,702 | 4/1971 | O'Keefe | 333/22 R |
| 3,211,922 | 10/1965 | Gregory et al. | 333/84 M |
| 3,343,107 | 9/1967 | Golightly | 333/84 M |
| 3,538,465 | 11/1970 | Manning, Jr. et al. | 333/84 M |
| 3,568,099 | 3/1971 | Chao | 333/81 M |

OTHER PUBLICATIONS

Alpha, "Integrated Semiconductor Modules," Microwave JR, 5–1968, Catalog D–68, pp. 2.

*Primary Examiner*—Rudolph V. Rolinec
*Assistant Examiner*—Wm. H. Punter
*Attorney*—William G. Gapcynski, Lawrence A. Neureither et al.

[57] ABSTRACT

A diode is mounted in a hole in a brass block and has one end soldered to the block. The other end of the diode is connected to the center conductor of a stripline. The brass block is in contact with the two ground planes of the stripline. Alternately the diode could be inserted through a hole in one of the ground planes and stripline boards to make contact with the center conductor. A ground contact plate would be affixed to the other side of the diode.

1 Claim, 5 Drawing Figures

NOVEL MOUNTING TECHNIQUE FOR GLASS-PACKAGE DIODES

BACKGROUND OF THE INVENTION

This invention is related to the field of mounting a diode in strip transmission lines. In the past such diodes inherently were subject to parasitic reactances. The prior art used a more expensive diode which was packaged in a metal ceramic configuration. The configuration of this invention offers a high power handling capability because of its improved heat sinking.

SUMMARY OF THE INVENTION

A glass-packaged PIN diode is placed in a brass block with one end soldered to the block and the other diode lead is adapted to be attached to the center conductor of a strip transmission line. The brass block is dropped directly into a machined slot in the stripline which accurately locates its position. The adapted diode lead is soldered to the stripline run. The ground return, as well as a firm clamping action is provided by the outside aluminum ground planes. In this configuration the diode is in shunt with the stripline and its total capacitance is stabilized; that is diode assembly now exhibits a more uniform capacitance value from unit to unit. In addition the diode lead inductance is reduced to a minimum and exhibits a uniform value from unit to unit.

An alternate way of obtaining higher reliability would be the use of a diode chip. A hole is cut into one of the ground planes and dielectric boards. The diode chip is inserted such that the anode is connected to the stripline run. The hole is threaded, and a nut acting as a plate is screwed into the hole and makes contact with the cathode of the diode chip. The nut acts as the ground contact for the diode.

DESCRIPTION OF THE PREFERRED EMBODIMENTS

Figure 1A:
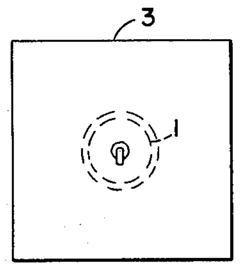
FIG. 1A and 1B show the glass-packaged PIN diode as inserted into the brass block.
Figure 1B:
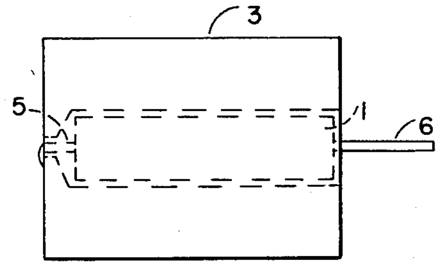

FIGS 1A and 1B show a glass-packaged PIN diode 1 which is inserted in a brass block 3. The brass block 3 has a hole drilled most of the way through so as to accept the body of the diode 1. A further hole is drilled all the way through so as to allow the extension of lead 5 through this hole so it can be soldered to the brass block. The other lead 6 is adapted to contact the center line conductor of a stripline. In this configuration the diode assembly exhibits a more uniform capacitance value from unit to unit. Also the diode lead inductance is reduced to a minimum.

Figure 2:
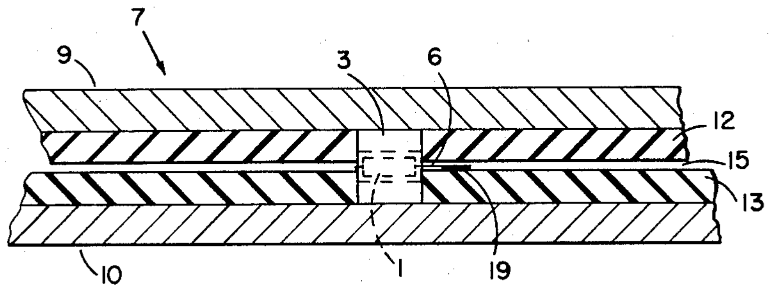
FIG. 2 is a cutaway view showing the packaged diode of FIGS. 1A and 1B inserted into a stripline.

Referring to FIG. 2 a stripline 7 is shown having aluminum ground planes 9 and 10, stripline boards 12 and 13, and center conductor 15. The brass block is dropped directly into a machined slot in the stripline so as to provide an exact location thereof. The diode lead 6 is soldered to the stripline run 19. The aluminum ground planes 9 and 10 provide a firm clamping action on the block 3 and also provide the electrical ground return as well so as to connect the diode in shunt with the stripline. This invention provides a uniformity of the electrical parameters of the diode assembly. Also a more precise placement of the diode at a given point on a strip transmission line is allowed by this invention.

Figure 3:
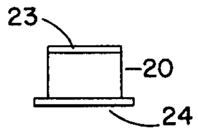
FIG. 3 shows a diode chip.

An alternate way of inserting the diode in shunt with the stripline is to use a diode chip 20 shown in FIG. 3. This diode chip has a cathode 23 and an anode 24.

Figure 4:
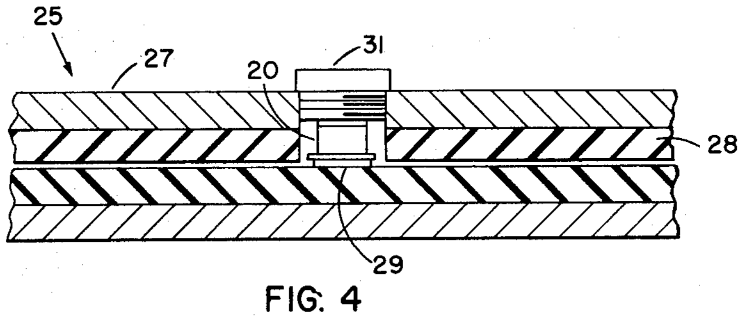
FIG. 4 is a cutaway view showing the diode chip of FIG. 3 inserted in a stripline.

FIG. 4 shows the diode 20 mounted in a stripline 25 a hole has been cut into the ground plane 27 and dielectric board 28 so as to allow insertion of the diode 20. The anode 24 of the diode contacts the stripline run 29 and the ground return for the cathode 23 is provided by a ground contact bolt 31. Ground plane 27 is threaded to accommodate bolt 31.

If the diode is to include an integral heat sink, as is often desirable where high power levels must be accommodated, the diode preferably is fabricated to provide this heat sink element on whichever of its two electrodes is to be connected to the ground plane. This affords better heat transfer from the diode than would the stripline center conductor. Thus in the embodiment of FIG. 2 the heat-sinked end would be that which connects to the brass block 3; in the embodiment of FIG. 4 it would be that which connects to bolt 31.

We claim:

1. A system comprising a glass-packaged PIN diode; said diode having first and second terminals; a brass block having a hole therein; said diode being inserted in the hole; said first terminal of the diode being connected to the brass block; a stripline having two ground planes, a center line conductor, and a pair of stripline boards sandwiching the center line conductor; said stripline boards being machined to provide a slot for said brass block; said brass block being located in said slot and making contact with both ground planes; and said second terminal of the diode being connected to the center conductor of said stripline.

* * * * *